US008677455B2

(12) United States Patent
Ogawara

(10) Patent No.: US 8,677,455 B2
(45) Date of Patent: Mar. 18, 2014

(54) AUTHENTICATION METHOD

(75) Inventor: Hideki Ogawara, Kawasaki (JP)

(73) Assignee: Fujitsu Limied, Kawasaki (JP)

( * ) Notice: Subject to any disclaimer, the term of this patent is extended or adjusted under 35 U.S.C. 154(b) by 1779 days.

(21) Appl. No.: 11/645,716

(22) Filed: Dec. 27, 2006

(65) Prior Publication Data

US 2008/0077974 A1     Mar. 27, 2008

(30) Foreign Application Priority Data

Aug. 30, 2006   (JP) .................................. 2006-234105

(51) Int. Cl.
*G06F 21/31*     (2013.01)
*G06F 21/36*     (2013.01)

(52) U.S. Cl.
CPC ................ *G06F 21/31* (2013.01); *G06F 21/36* (2013.01)
USPC .............................................. 726/4; 713/183

(58) Field of Classification Search
USPC ................................ 726/2–5, 7; 713/182, 183
See application file for complete search history.

(56) References Cited

U.S. PATENT DOCUMENTS

| 5,559,961 A | 9/1996 | Blonder |
| 6,097,841 A * | 8/2000 | Gunji et al. ................... 382/229 |
| 6,693,888 B2 * | 2/2004 | Cafarelli et al. .............. 370/338 |
| 6,707,942 B1 * | 3/2004 | Cortopassi et al. ........... 382/186 |
| 6,996,248 B2 * | 2/2006 | Fudge et al. ................... 382/100 |
| 6,996,387 B2 * | 2/2006 | Chan .............................. 455/301 |
| 7,007,168 B2 * | 2/2006 | Kubo et al. .................... 713/183 |
| 7,386,731 B2 * | 6/2008 | Sanai et al. .................... 713/183 |
| 7,590,586 B2 * | 9/2009 | Kitayama ........................ 705/37 |
| 7,725,725 B1 * | 5/2010 | Odom ............................ 713/176 |
| 7,733,962 B2 * | 6/2010 | Weiss et al. ............... 375/240.25 |
| 7,769,900 B1 * | 8/2010 | Chalfin et al. ................. 709/247 |
| 7,837,556 B2 * | 11/2010 | Breckner et al. ............... 463/30 |
| 2002/0108039 A1 * | 8/2002 | Kubo et al. ..................... 713/172 |

FOREIGN PATENT DOCUMENTS

| JP | 7-295673 A | 11/1995 |
| JP | 2000-339084 | 12/2000 |
| JP | 2005-050251 | 2/2005 |

OTHER PUBLICATIONS

Japanese Office Action mailed Sep. 13, 2011 for corresponding Japanese Application No. 2006-234105, with English-language Translation.

* cited by examiner

*Primary Examiner* — Saleh Najjar
*Assistant Examiner* — Oleg Korsak
(74) *Attorney, Agent, or Firm* — Fujitsu Patent Center

(57) ABSTRACT

To provide an authentication technology acquiring high security with a simple configuration. In an information processing device utilizing a user's input operation for authentication, an input frame is displayed to the user, the user is prompted to input a keyword to within the input frame, a magnitude of the input by the user is judged, and the inputted keyword is judged, results of the judgments are used as authentication information for the authentication. A magnitude of the input may be a size of the input frame and a size of a character, which are designated by the user.

8 Claims, 8 Drawing Sheets

AUTHENTICATION METHOD

CROSS-REFERENCE TO RELATED APPLICATIONS

This application is based upon and claims the benefit of priority of the prior Japanese Patent Application Serial No. 2006-234105, filed on Aug. 30, 2006, the entire contents of which are incorporated herein by reference.

BACKGROUND OF THE INVENTION

The present invention relates to a technology of making authentication by inputting a password.

In a case where authentication is required on the occasion of log-in to a computer and opening a file, it is a general practice that a user inputs a password from on a keyboard (including a virtual keyboard).

This password might be, however, presumed by others because of there being many users who set their easy-to-memorize birth days, telephone numbers, etc as the passwords.

Further, if the number of digits of the password is set excessively large, the user is unable to memorize the password, and the usability declines, so that the password is set with a small number of digits in many cases. The password having the small number of digits has, however, a possibility of receiving unauthorized accesses by a brute force attack.

Hence, there are proposed a variety of methods of strengthening the security by use of multiple additional/substitutive means such as a smartcard, fingerprints and a TPM (Trusted Platform Module).

Moreover, technologies disclosed in, e.g., the following Patent documents 1, 2 are given as the prior arts related to the invention of the present application.

[Patent document 1] Japanese Patent Application Laid-Open Publication No.2000-339084
[Patent document 2] Japanese Patent Application Laid-Open Publication No.2005-50251

SUMMARY OF THE INVENTION

The authentication using the additional/substitutive means requires a special card, a special piece of hardware, etc and therefore presents a problem such as a lost card and cost-up of the hardware.

Such being the case, the present invention provides an authentication technology acquiring high security with a simple configuration.

The present invention adopts the following configuration in order to solve the problems.

Namely, an information processing device utilizing a user's input operation for authentication according to the present invention, comprises a display unit displaying an input frame to the user, a keyword input module prompting the user to input a keyword to within the input frame, a first input judging module judging a magnitude of the input by the user, and a second input judging module judging the inputted keyword, wherein results of the judgments made by the first input judging module and by the second input judging module are used as authentication information for the authentication.

The magnitude of the input, which is judged by the first input judging module, may be a size of the input frame designated by the user.

The first input judging module may use, as the authentication information, the input frame selected by the user from the input frames having different sizes.

Further, an information processing device according to the present invention, on the occasion of setting a user's input operation used for authentication, may comprise a keyword setting module setting a keyword used when authenticating, and an input setting module setting a magnitude of the input used when authenticating.

An authentication method of utilizing a user's input operation for authentication according to the present invention is characterized by comprising a displaying step of displaying an input frame to the user, a keyword inputting step of prompting the user to input a keyword to within the input frame, a first input judging step of judging a magnitude of the input by the user, and a second input judging step of judging the inputted keyword, wherein results of the judgments made in the first input judging step and in the second input judging step are used as authentication information for the authentication.

Still further, the present invention may also be a program making a computer execute the method described above. Yet further, the present invention may also be a readable-by-computer recording medium recorded with this program. The computer is made to read and execute the program on this recording medium, whereby the function thereof can be provided.

Herein, the readable-by-computer recording medium connotes a recording medium capable of storing information such as data, programs, etc electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc are given as those demountable from the computer.

Further, a hard disc, a ROM (Read-Only Memory), etc are given as the recording mediums fixed within the computer.

According to the present invention, it is possible to provide the authentication technology acquiring the high security with the simple configuration.

DETAILED DESCRIPTION OF THE PREFERRED EMBODIMENT

<First Embodiment>
A best mode for carrying out the present invention will hereinafter be described with reference to the drawings. Configurations in the following embodiments are exemplifications, and the present invention is not limited to the configurations in the embodiments.

Figure 1:
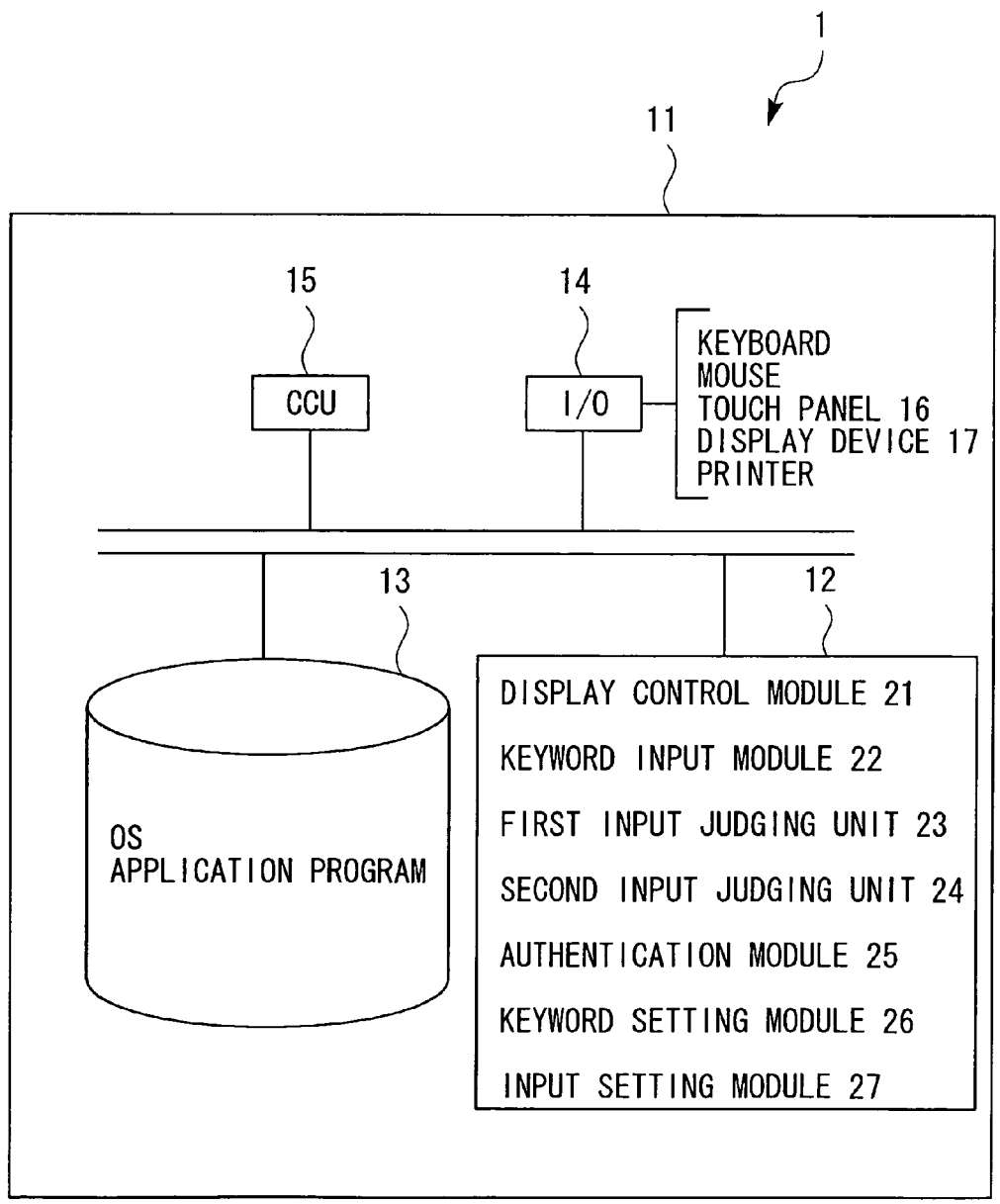
FIG.1 is a diagram of a schematic configuration of an information processing device in a first embodiment according to the present invention.

FIG. 1 is a schematic diagram of an information processing device that utilizes a user's input operation for authentication.

As shown in FIG. 1, an information processing device 1 is a general-purpose computer that includes, within a main body 11, an arithmetic processing unit 12 constructed of a CPU (Central Processing Unit), a main memory, etc, a storage unit (hard disc) 13 stored with data and software for the arithmetic process, an input/output (I/O) port 14, a communication control unit (CCU) 15 and so on.

The storage unit 13 is preinstalled with an operating system (OS) and application software (an authentication program etc).

Connected properly to the I/O port 14 are an input device including a keyboard, a mouse and a touch panel (digitizer) 16 and also an output device including a display device 17 and a printer. The input device is utilized also as a keyword input unit in which a character string such as a password and a keyword (the character string will hereinafter be simply referred to as the keyword) is inputted into an input frame through the user's operation. It should be noted that the information processing device in the present example is a so-called pen PC, wherein a main input means is the touch panel 16 superposed on the screen (display device) 17.

The communication control unit 15 performs communications with other computers via a communication line such as the Internet.

The arithmetic processing unit 12 properly reads, from the storage unit 13, and executes the OS and the application program, and arithmetically processes the information inputted from the I/O port 14 and from the communication control unit 15 and also the information read from the storage unit 13, thereby functioning also as a display control module (corresponding to a display module) 21, a keyword input module 22, a first input judging module 23, a second input judging module 24, an authentication module 25, a keyword setting module 26 and an input setting module 27.

The keyword setting module 26 receives an input of the keyword used for the authentication through the user's operation, then gets this keyword stored beforehand in the storage unit 13, and sets it as a reference keyword for the authentication.

Similarly, the input setting module 27 receives an input of a size (dimensions) and a position used for the authentication through the user's operation, then gets the size and the position stored previously in the storage unit 13, and sets them as a reference input size and a reference input position for the authentication.

The display control module 21 controls the display device 17 to draw a frame having a predetermined size and a frame having a size matching with a user's input, thus displaying the input frame to the user. Note that in the present example, the input frame is displayed on the display device 17 included in the information processing device 1, however, such a scheme may also be taken that the display control module (display module) 21 transmits display information to the information processing device existing in a remote place via a an external display device and via a network, and the input frame is displayed to the user by displaying this display information on the information processing device.

The first input judging module 23 judges how much large the input of the user is. For instance, the first input judging module 23 judges a size of the input frame designated by the user and a magnitude (size) of the keyword inputted by the user. Further, the first input judging module 23 may also judge a position of the input frame.

The second input judging module 24 judges the inputted keyword. For example, the second input judging module 24 recognizes, as a keyword, a character written by the user with a stylus pen (which will hereinafter be simply termed a pen) on the touch panel 16.

The authentication module 25 uses results of the judgments made by the first input judging module 23 and by the second input judging module 24, as authentication information for the authentication.

<Authentication Setting Method>

An authentication setting method executed in the information processing device 1 having the configuration described above will be explained with reference to FIGS. 2 through 4.

Figure 2:
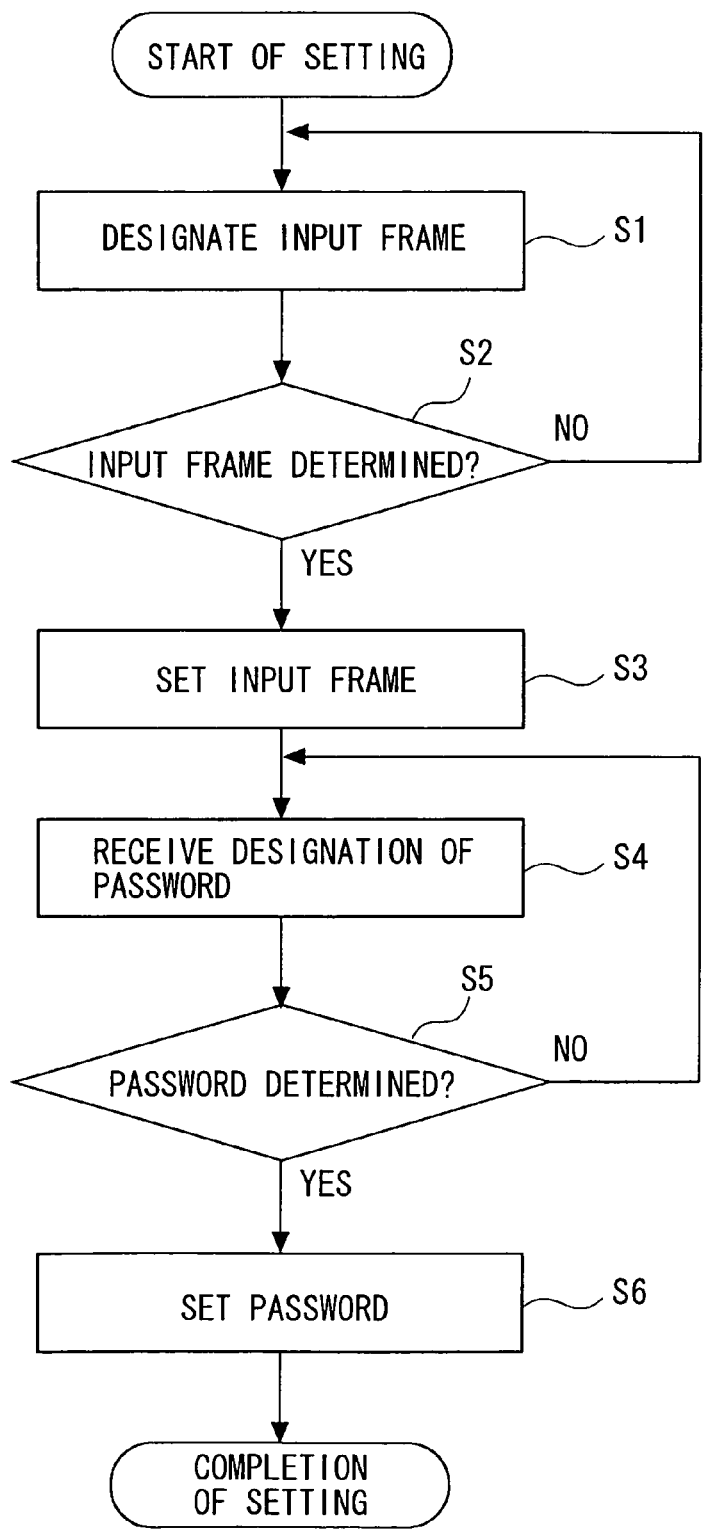
FIG. 2 is an explanatory flowchart of an authentication setting method.

When a setting mode is selected by the user's operation, an authentication setting program is executed, and, as shown in FIG. 2, the setting of the authentication information is done. To start with, an area designated by the user with the input device is set as the input frame. For instance, the user designates a starting point of the input frame, which is pointed with the pen on the screen (the touch panel 16), then drags the pen as it is to a desired position without separating the pen from on the screen, and designates an endpoint of the input frame by separating the pen from on the screen. When the input setting module 27 receives information about the designated input area (defined by the starting point and the endpoint), the display control module 21 displays a rectangular shape in which the starting point and the endpoint are diagonal positions, on the screen (the display device 17) (step 1, which will hereinafter also be abbreviated to S1).

Figure 3:
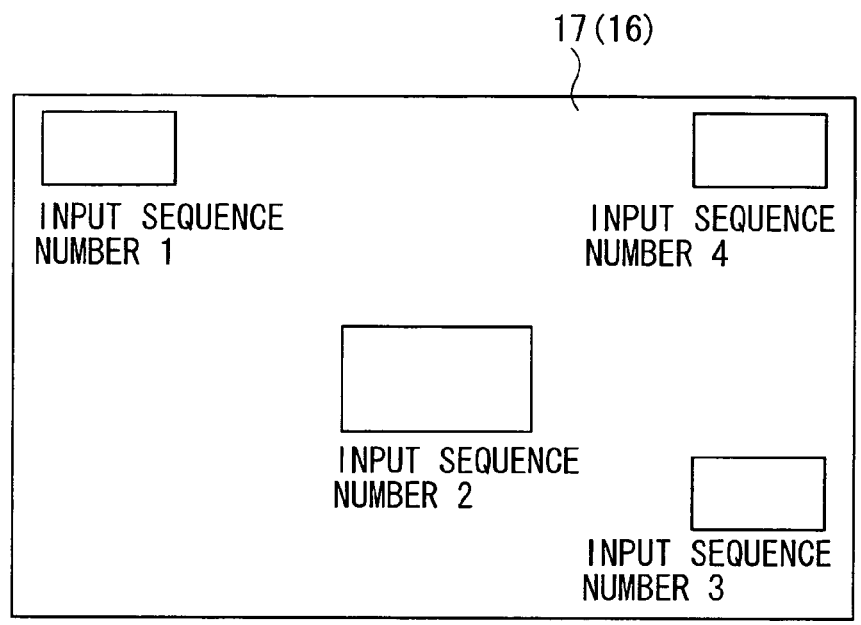
FIG.3 is a diagram showing an example of a screen.

The user repeats this designation of the input frame a predetermined number of times, at least, a plural number of times. Namely, the input setting module 27 judges whether or not the user selects determination of the input frame (S2), and, if a next input frame is designated without selecting the determination, returns to step 1. Further, in step 2, if the determination of the input frame is selected, for example, if an enter key (unillustrated) is pressed, the input setting module 27 gets the size, the position and an input sequence number about each input frame stored as items of authentication information in the storage unit 13, and sets these items of authentication information as the reference information for the authentication (S3). FIG. 3 illustrates a state where four input areas are designated, wherein the areas specified by an inputted sequence order (input sequence numbers) such as 1, 3, 4 have the same size, while the area specified by an input sequence number "2" is larger than these areas. Namely, two types of sizes, i.e., large and small, are employed. It is to be noted that in the present example, the input frames have the two types of sizes, however, three or more sizes may also be used without being limited to the two types.

Then, a keyword inputted to the set input frame is designated. For instance, when the user writes a character with the pen within the input frame on the screen (the touch panel 16), the keyword setting module 26 specifies a code of the character and receives the keyword that should be inputted to the input frame (S4).

Figure 4:
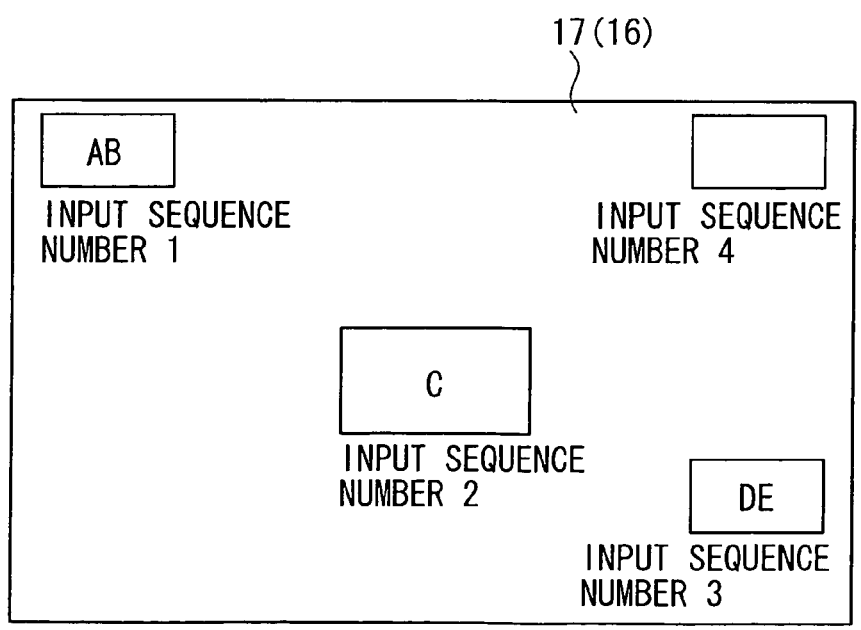
FIG.4 is a diagram showing an example of the screen.

The user repeats this designation of the keyword a predetermined number of times, at least, a plural number of times. Namely, the keyword setting module 26 judges whether or not the user selects determination of the keyword (S5), and, if a next keyword is designated without selecting the determination, returns to step 4. Further, in step 5, if the determination of the keyword is selected, for example, if the enter key (not shown) is pressed, the keyword setting module 26 associates the keyword with each input frame, then gets the keyword stored as the authentication information in the storage unit 13, and sets this authentication information as the reference information for the authentication (S6). Note that a password inputted to one input frame may be one character and may also be a plurality of characters, and only the input frame (a dummy area) with no setting of the password may be provided. In FIG. 4, two characters are inputted to the input area disposed on a left upper side and to the input area disposed on a right lower side, while the input frame disposed on a right upper side is set as a dummy area.

<Authentication Method>

Next, an authentication method executed by the information processing device 1 having the configuration described above will be explained with reference to FIGS. 5 through 7.

Figure 5:
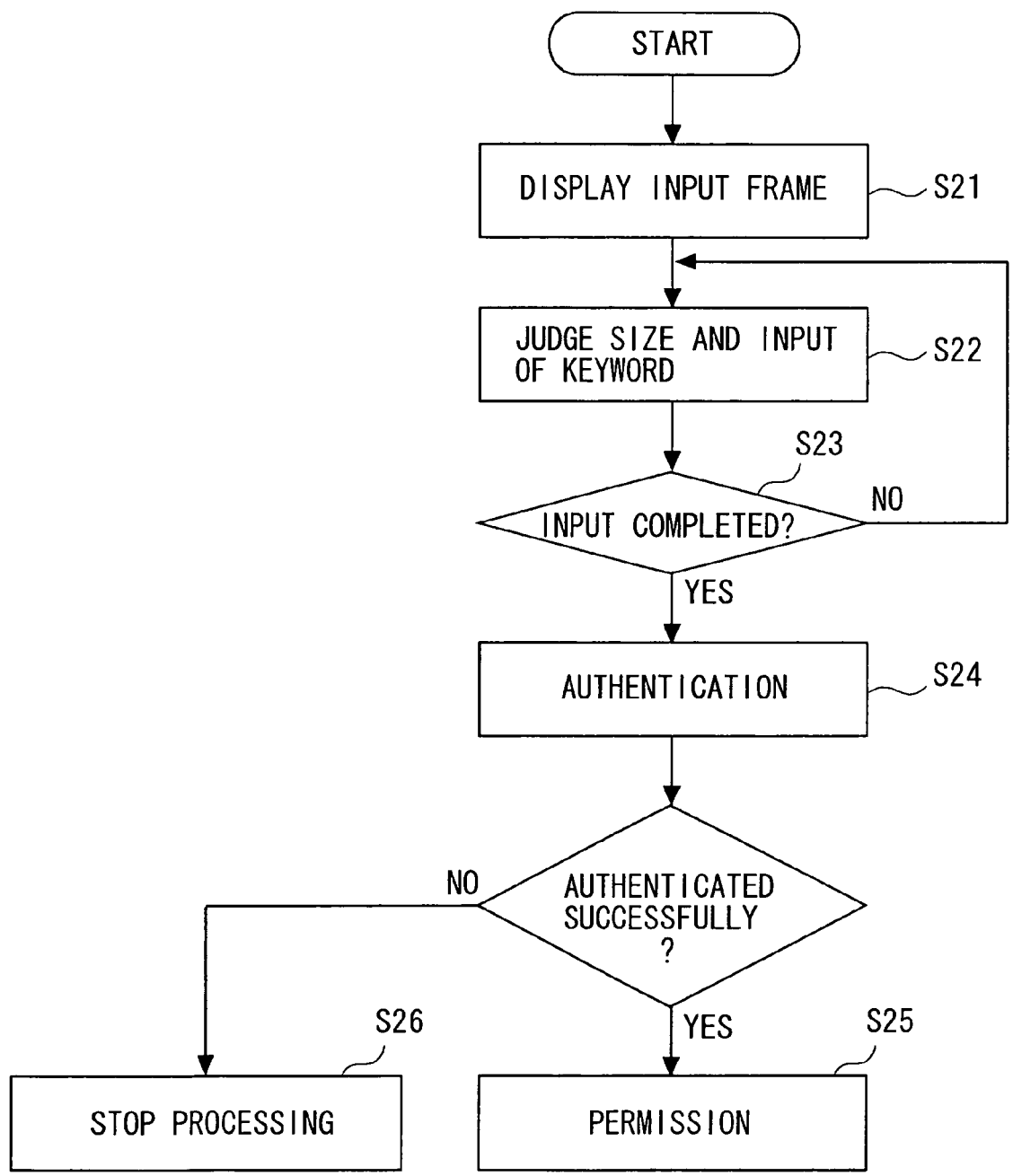
FIG.5 is an explanatory flowchart of an authentication method.

The authentication program is executed at predetermined timing such as power-on of the information processing device 1 and log-on of the OS, and an authentication process is carried out as in FIG. 5.

Figure 6:
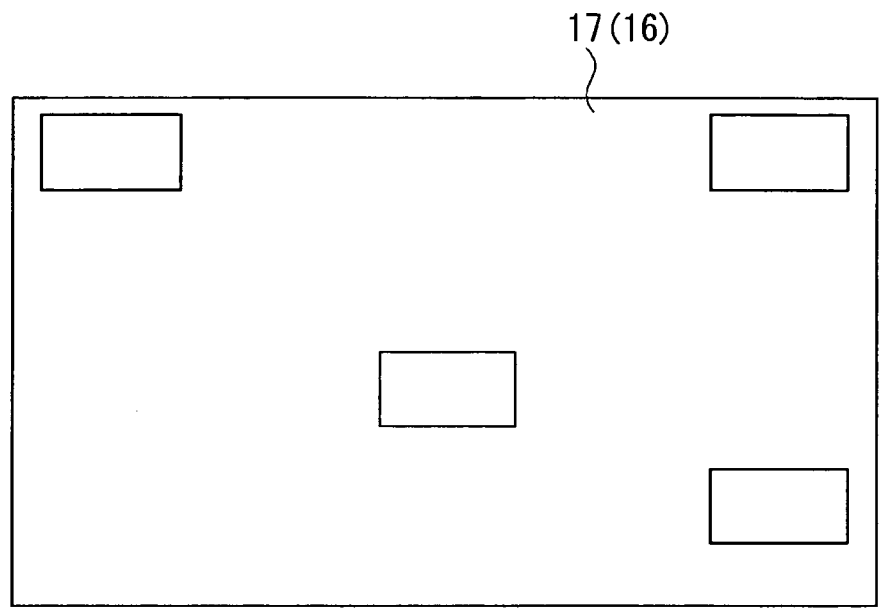
FIG.6 is a diagram showing an example of the screen.
Figure 7:
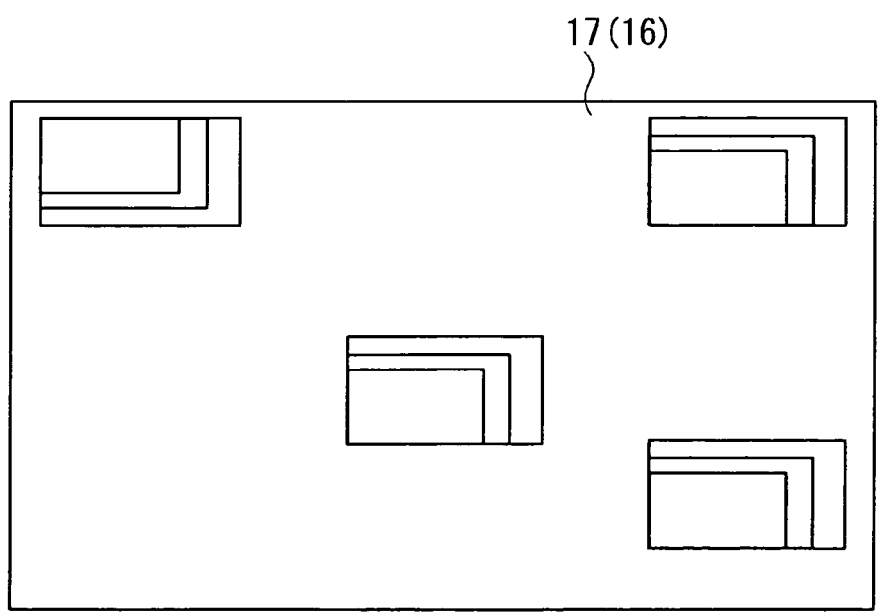
FIG.7 is a diagram showing an example of the screen.

At first, the display control module 21 refers to the storage unit 13 and displays the input frames in set positions on the screen (the display device 17) (S21). At this time, the display control module 21, as shown in FIG. 6, displays all of the input frames in the same size, wherein the input frames are displayed all in the small size in the present example.

The user changes the size of the input frame to a set size. For example, when the user points at the input frame with the pen for 1 sec or longer on the screen (the touch panel 16), the display control module 21 displays the input frame in a plurality of sizes including the set size while sequentially changing the size thereof. At a point of time when the input frame is displayed in a desired size, the user separates the pen from on the screen, then the display control module 21 stops changing the size of the input frame, and the first input judging module 23 judges the size of this designated input frame and temporarily stores this size (S22). In the present example, the input frame is displayed in the large or small size, and any one of the input frames is selected. It should be noted that such a scheme may, without being limited to this, also be available that the user can select the input frame from those having different sizes. For example, as in FIG. 7, the available scheme is that plural input frames having different sizes are displayed respectively in predetermined positions (four positions in the present example), and the input frame tapped by the user with the pen is selected. At this time, an input frame having a size other than the set sizes (large and small in the present example) may also be displayed as an option.

Moreover, in the same way as when setting, the user may designate the position and the size of the input frame by inputting the starting point and the endpoint of the input frame with the pen. In this case, if the inputted position and size get discrepant from those designated, there may be added a process of deeming those as the most approximate position and size.

Then, the user inputs the keyword to each input frame. In the present example, when the user writes a character with the pen within the input frame on the screen (the touch panel 16), the second input judging module 24 judges the character information to be a keyword for the input frame.

The authentication module 25 monitors whether the input of the keyword is completed or not (S23), and, if the keyword is inputted without selecting the completion, returns the processing to step 22. Whereas if the completion of the keyword input is selected in step 23, e.g., if the enter key (unillustrated) is pressed, the authentication module 25 uses, as the authentication information, the position and the size of each input frame that are judged by the first input judging module 23, and conducts the authentication on the basis of whether this authentication information is coincident with the authentication information set in the storage unit 13. Moreover, the authentication module 25 uses, as the authentication information, an associative relationship between the keyword judged by the second input judging module 24, the input sequence number of the keyword and the input frame to which the keyword is inputted, and makes the authentication on the basis of whether this authentication information is coincident with the authentication information set in the storage unit 13 (S24).

Then, the authentication module 25, if both of the results of the judgments (the authentication information) made by the first input judging module 23 and by the second input judging module 24 are coincident with the authentication information previously set in the storage unit 13, deems that the authentication gets successful, then permits the predetermined process such as the log-on (S25), and, whereas if the authentication information is not coincident, deems that the authentication gets unsuccessful, with the result that the predetermined process such as the log-on is stopped (S26).

Thus, according to the first embodiment, the authentication is conducted by combining the size and the position of the input frame without being limited to the use of only the keyword, and hence high security is acquired.

Further, the number of the characters inputted to each input frame can be set arbitrarily, so that there is relatively high resistance against a brute force attack even when having a small number of characters of the keyword to be inputted.

Note that the designation of the input frame and the input of the keyword involve using the touch panel 16 in the example given above, however, the keyword may be inputted by use of the keyboard in a way that designates the input frame with a tab key and arrow keys. In this case, even when trying to steal the keyword by storing the key operation as by a key logger, the size of the input frame can not be judged from the simple key operation, and it is therefore possible to prevent an overall leakage of the authentication information.

FIRST MODIFIED EXAMPLE

Figure 8:
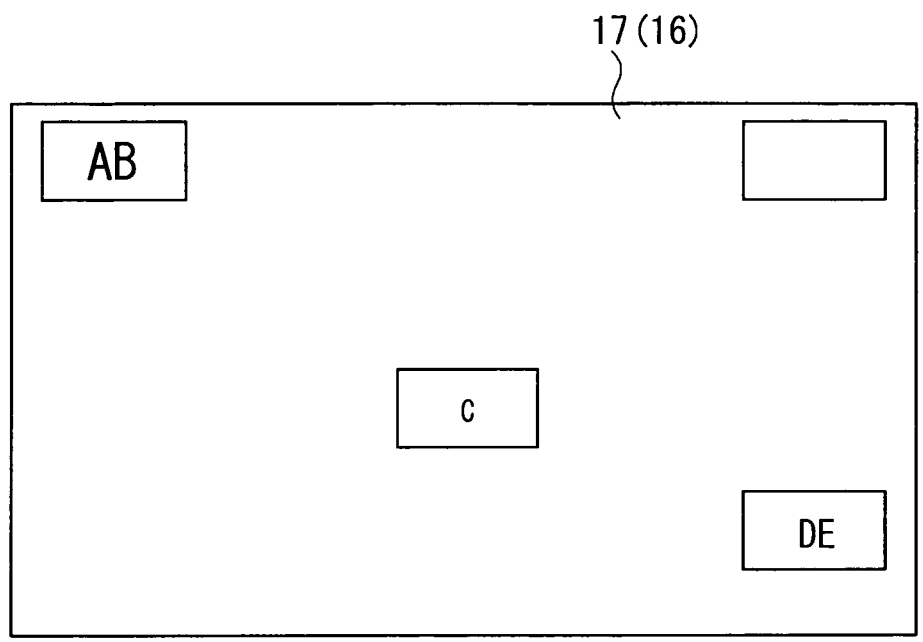
FIG.8 is a diagram showing an example of the screen.

FIG. 8 shows an example of using a size of the character as a substitute for the size of the input frame by way of the magnitude of the input. Note that other configurations are the same as those in the first embodiment described above.

When the setting mode is selected and when, as shown in FIG. 2, the setting of the authentication information is done, to begin with, the area designated by the user with the input device is set as the input frame. In the present example, the user taps on the screen (the touch panel 16) with the pen and thus designates the position, and the input frame having a predetermined size is displayed in this designated position (S1).

In the same way as done above, it is monitored whether the determination of the input frame is selected or not (S2), and, if the user selects the determination after repeating the designation of the input frame a plural number of times, the input setting module 27 gets the position and the input sequence number about each input frame stored as the authentication information in the storage unit 13, and sets these items of authentication information as the reference information for the authentication (S3).

Then, the keyword inputted to the set input frame is designated. For instance, when the user writes a character with the pen within the input frame on the screen (the touch panel 16), the keyword setting module 26 specifies a code of the character and receives the keyword that should be inputted to the input frame (S4). At this time, the keyword setting module 26 judges dimensions (size) of the character. This character size may be defined in whatever manner on the condition that the size is distinguishable to the user on the screen such as the number of pixels forming a height of the written character and a ratio of the character height to a height of the input frame.

In the same way as done above, it is monitored whether the determination of the keyword is selected or not (S5), and, if the user selects the determination after repeating the designation of the keyword a plural number of times, the keyword setting module 26 gets an associative relationship between each input frame and the keyword and the magnitude of the keyword stored as the authentication information in the storage unit 13, and sets these items of authentication information as the reference information for the authentication (S6).

Then, when the authentication program is executed at the predetermined timing such as the power-on of the information processing device 1 and the log-on of the OS, the authentication process is carried out as in FIG. 5.

At first, the display control module 21 refers to the storage unit 13 and displays the input frames in the set positions on the screen (the display device 17) (S21).

The user inputs the keyword to each input frame (S22). In the present example, when the user writes the character in the preset size within the input frame on the screen (the touch panel 16), the second input judging module 24 judges the character information as the keyword for the input frame, and the first input judging module 23 judges a size of this character. In the present example, if a ratio of the character height to the height of the input frame is less than 25%, the size is judged small, if the ratio is equal to or larger than 25% but less than 60%, the size is judged intermediate, and if the ratio is equal to or larger than 60%, the size is judged large. FIG. 8 shows an example where large-sized characters are inputted to the input frame disposed on the left upper side, a small-sized character is inputted to the input frame disposed at the center, and intermediate-sized characters are inputted to the input frame disposed on right lower side.

In the same manner as done above, it is judged whether the input of the keyword is completed or not (S23), and, if the user selects the completion after repeating the input of the keyword, the authentication module 25 uses, as the authentication information, the size (the character size) of each keyword that is judged by the first input judging module 23, and performs the authentication based on whether this authentication information is coincident with the authentication information set in the storage unit 13. Further, the authentication module 25 uses, as the authentication information, the associative relationship between the keyword judged by the second input judging module 24, the input sequence number of the keyword and the input frame to which the keyword is inputted, and makes the authentication on the basis of whether this authentication information is coincident with the authentication information set in the storage unit 13 (S24).

Thus, according to the first modified example, the authentication is conducted by combining the size (the character size) of the keyword and the position without being limited to the use of only the keyword, and hence the high security is acquired.

It should be noted that only the size of the keyword is employed as the magnitude of the input in the present example, however, in combination with the first embodiment discussed above, the size of the keyword and the size of the input frame may also be used as the magnitude of the input for the authentication.

SECOND MODIFIED EXAMPLE

Figure 9:
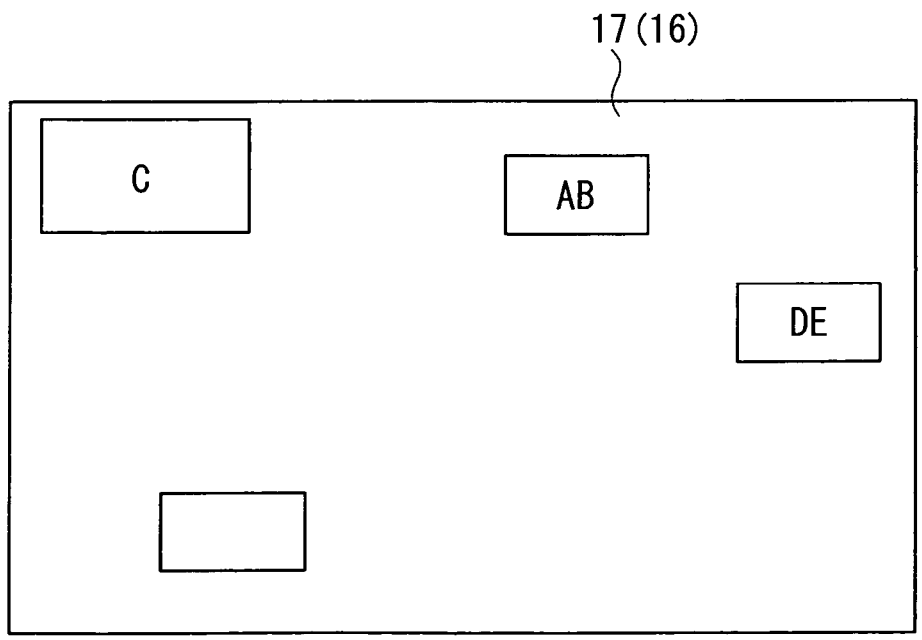
FIG.9 is a diagram showing an example of the screen.

FIG. 9 shows an example of judging an associative relationship with the should-be-inputted keyword according to the size of the input frame without specifying the position of the input frame.

Note that the authentication setting method in the present example is the same as in the first embodiment illustrated in FIG. 2. The keyword setting module 26, however, associates the keyword with not the position of the input frame but the size of each input frame, and thus sets the associative relationship therebetween.

The example in FIG. 4 is that firstly "AB" is inputted to the input frame having the small size, secondly "C" is inputted to the input frame having the large size, and thirdly "DE" is inputted to the input frame having the small size.

Then, on the occasion of conducting the authentication, at first, the display control module 21 refers to the storage unit 13, and displays the input frames having the set sizes in random positions on the screen (the display device 17) as in FIG. 9 (S21).

The user inputs the keyword to each input frame. In the present example, when the user writes the character corresponding to the size of the input frame within the input frame on the screen (the touch panel 16), the second input judging module 24 judges the character code as the keyword for the input frame, and the first input judging module 23 judges the size of this input frame (S22). In the present example, if the input frames are of the same size, the keyword may be inputted to any input frame irrespective of the position.

In the same way as done above, it is judged whether the input of the keyword is completed or not (S23), and, if the user selects the completion after repeating the input of the keyword, the authentication module 25 uses, as the authentication information, an associative relationship between the size of the input frame that is judged by the first input judging module 23, the keyword judged by the second input judging module 24, the input sequence number of the keyword and the size of the input frame to which the keyword is inputted, and performs the authentication based on whether this authentication information is coincident with the authentication information set in the storage unit 13 (S24).

Thus, according to the second modified example, the authentication is conducted by combining with the size of the input frame without being limited to the use of only the keyword, and hence the high security is acquired.

<Second Embodiment>

Figure 10:
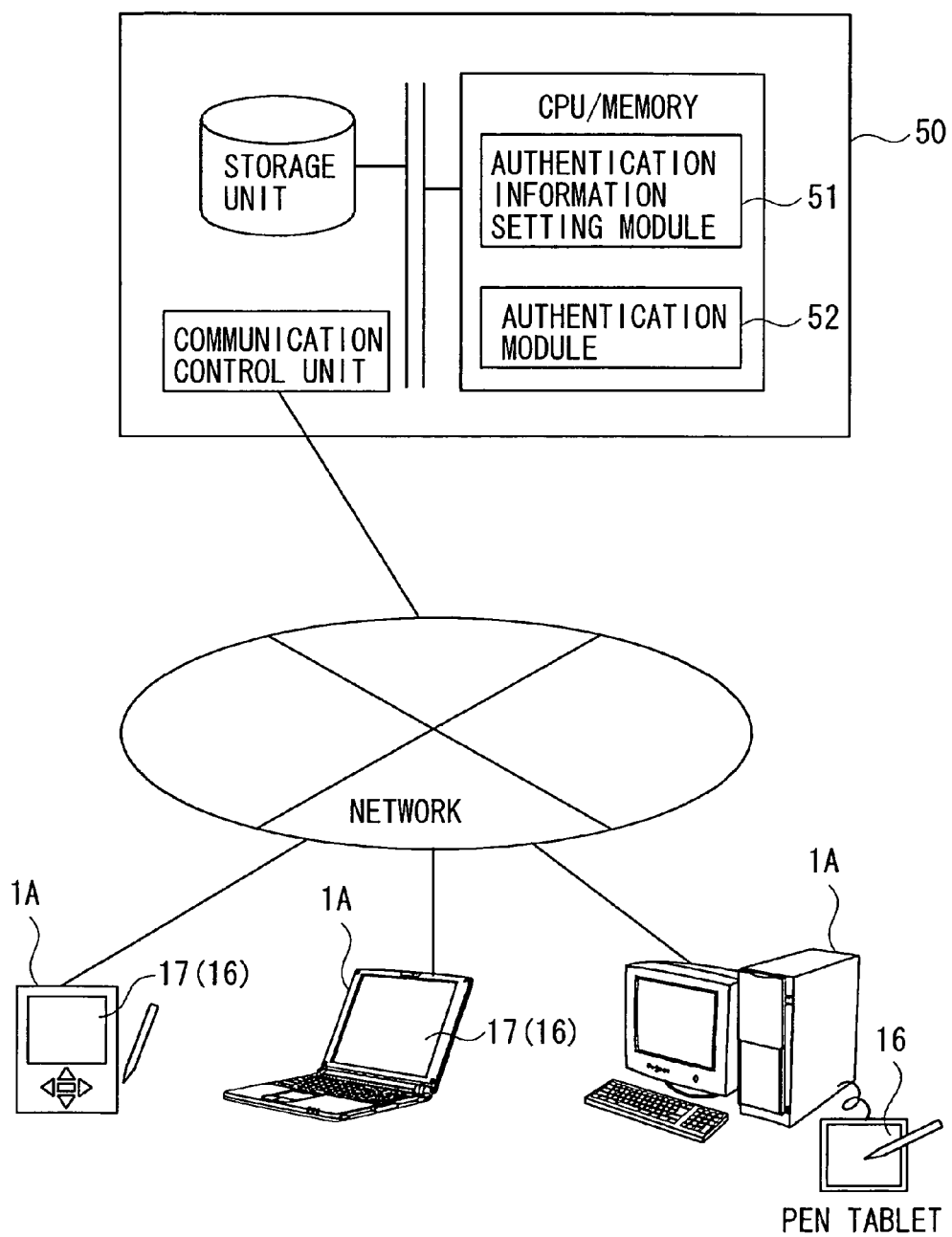
FIG.10 is a whole diagram of a second embodiment according to the present invention.
Figure 11:
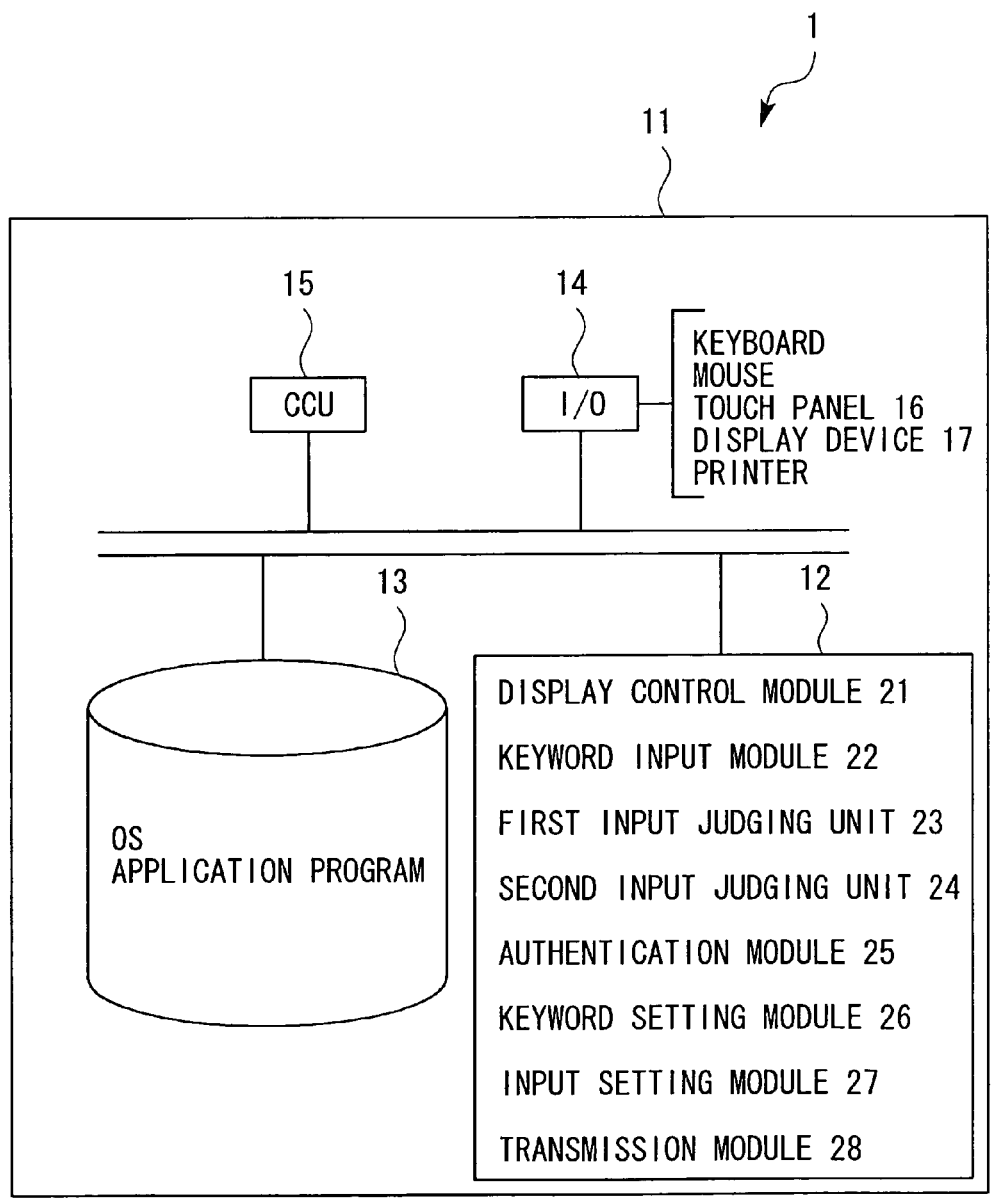
FIG.11 is a diagram of a schematic configuration of the information processing device in a second embodiment according to the present invention.

FIG. 10 is an explanatory diagram of the authentication system in a second embodiment according to the present invention, and FIG. 11 is a diagram schematically showing a configuration of the information processing device in the second embodiment.

The authentication device in the second embodiment is different from the first embodiment discussed above in terms of a configuration for setting the authentication information in the authentication device, transmitting the input information to the authentication device and conducting the authentication in the authentication device, but other configurations are the same. Therefore the repetitive explanations are omitted in a way that marks the same components with the same numerals and symbols.

In FIG. 10, an authentication device 50 is a so-called authentication server connected to an information processing device 1A via a network such as LAN.

The authentication device 50 is a general-purpose computer that includes a CPU, a memory, a storage device (hard disc), etc. The authentication device 50 executes a predetermined program by the CPU etc, thereby actualizing an authentication information setting module and an authentication module.

An authentication information setting module 51 receives a request for setting the authentication information from the information processing device 1A, and stores (sets) the setting request in the storage device.

Further, an authentication module 52, when receiving a request for authenticating the authentication information from the information processing device 1A, compares this authentication information with the authentication information stored in the storage means, and thus judges whether or not these pieces of authentication information are coincident with each other.

The information processing device 1A in FIG. 11 has a different point of providing a transmission module 28 in addition to the components of the information processing device 1 in FIG. 1.

The transmission module 28 transmits the authentication information to the authentication device 50 via a communication control unit 15.

<Authentication Setting Method>

An authentication setting method executed in the authentication system having the configuration described above will be explained with reference to FIG. 2.

When a setting mode is selected in the information processing device 1A through a user's operation, the authentication setting program is executed, and, as shown in FIG. 2, the setting of the authentication information is done. At first, an area designated by the user with the input device is set as the input frame. For instance, the user designates a starting point of the input frame, which is pointed with the pen on the screen (the touch panel 16), then drags the pen as it is to a desired position without separating the pen from on the screen, and designates an endpoint of the input frame by separating the pen from on the screen. When the input setting module 27 receives information about the designated input area (defined by the starting point and the endpoint), the input display control module 21 displays a rectangular shape in which the starting point and the endpoint are diagonal positions, on the screen (the display device 17) (S1).

The user repeats this designation of the input frame a predetermined number of times, at least, a plural number of times. Namely, the transmission module 28 judges whether or not the user selects determination of the input frame (S2), and, if a next input frame is designated without selecting the determination, returns to step 1. Further, in step 2, if the determination of the input frame is selected, for example, if an enter key (unillustrated) is pressed, the transmission module 28 gets the size and the position of each input frame stored in the storage unit 13, and sets the size, the position and the input sequence number of each input frame as the authentication information by way of the reference information for the authentication (S3).

Then, a keyword inputted to the set input frame is designated. For example, when the user writes a character with the pen within the input frame on the screen (the touch panel 16), the keyword setting module 26 specifies a code of the character and receives the keyword that should be inputted to the input frame (S4).

The user repeats this designation of the keyword a predetermined number of times, at least, a plural number of times. Namely, the transmission module 28 judges whether or not the user selects determination of the keyword (S5), and, if a next keyword is designated without selecting the determination, returns to step 4. Further, in step 5, if the determination of the keyword is selected, for example, if the enter key (not shown) is pressed, the transmission module 28 associates the keyword with each input frame, then transmits these associated pieces of information as the authentication information to the authentication device 50, and sets this authentication information as the reference information for the authentication (S6).

<Authentication Method>

Next, an authentication method executed by the information processing device 1 having the configuration described above will be explained with reference to FIG. 5.

The authentication program is executed at predetermined timing such as power-on of the information processing device 1 and log-on of the OS, and an authentication process is carried out as in FIG. 5.

At first, the display control module 21 refers to the storage unit 13 and displays the input frames in set positions on the screen (the display device 17) (S21). At this time, the display control module 21, as shown in FIG. 1, displays all of the input frames in the same size, wherein the input frames are displayed all in the small size in the present example.

The user changes the size of the input frame to a set size. For example, when the user points at the input frame with the pen for 1 sec or longer on the screen (the touch panel 16), the display control module 21 displays the input frame in a plurality of sizes including the set size while sequentially changing the size thereof. At a point of time when the input frame is displayed in a desired size, the user separates the pen from on the screen, then the display control module 21 stops changing the size of the input frame, and the first input judging module 23 judges the size of this designated input frame and temporarily stores this size (S22). In the present example, the input frame is displayed in the large or small size, and any one of the input frames is selected.

Then, the user inputs the keyword to each input frame. In the present example, when the user writes a character with the pen within the input frame on the screen (the touch panel 16), the second input judging module 24 judges the character information to be a keyword for the input frame.

The transmission module 28 monitors whether the input of the keyword is completed or not (S23), and, if the keyword is inputted without selecting the completion, returns the processing to step 22. Whereas if the completion of the keyword input is selected in step 23, e.g., if the enter key (unillustrated) is pressed, the authentication module 25 transmits, as the authentication information, the position and the size of each input frame that are judged by the first input judging module 23, and also the associative relationship between the keyword judged by the second input judging module 24, the input sequence number of the keyword and the input frame to which the keyword is inputted, to the authentication device 50.

The authentication device receiving the authentication information form the information processing device 1A conducts the authentication based on whether or not this authentication information is coincident with the authentication information set in the storage unit (S24)

Then, the authentication device 50, if the receiving information is coincident with the authentication information previously set in the storage unit, deems that the authentication gets successful, then permits the predetermined process such as the log-on (S25), and, whereas if the authentication information is not coincident, deems that the authentication gets unsuccessful, with the result that the predetermined process such as the log-on is stopped (S26).

Thus, according to the second embodiment, the authentication is carried out by combining with the size and the position of the input frame without being limited to the use of only the keyword, and hence the high security is acquired.

<Others>

The present invention is not limited to only the illustrated examples given above and can be, as a matter of course, changed in a variety of forms in the range that does not deviate from the gist of the present invention.

<Incorporation by reference>

The disclosures of Japanese patent application No.JP2006-234105 filed on Aug. 30, 2006 including the specification, drawings and abstract are incorporated herein by reference.

What is claimed is:

1. An information processing device utilizing a user's input operation for authentication, comprising:
    a memory; and
    a processor connected to the memory, wherein the processor is configured to operate in accordance with executable instructions that, when executed, cause the processor to perform:
        generating a plurality of input frame data having different sizes, the input frame data prompting the user to input a keyword;
        judging a magnitude of the input by the user, the magnitude defined with a size of the input frame designated by the user from the input frames having different sizes;
        judging the inputted keyword; and
        judging a position of the input frame inputted by the user, the position of the input frame judged by coordinates of the input frame,
        wherein results of the judgments are used as authentication information for the authentication.

2. The information processing device according to claim 1, wherein the processor is configured to operate in accordance with executable instructions that, when executed, further cause the processor to perform conducting the authentication on the basis of the authentication information.

3. The information processing device according to claim 1, wherein the processor is configured to operate in accordance with executable instructions that, when executed, further cause the processor to perform transmitting the authentication information to an authentication device, the authentication device conducting the authentication on the basis of the authentication information.

4. An information processing device setting a user's input operation used for authentication, comprising:
    a memory; and
    a processor connected to the memory, wherein the processor is configured to operate in accordance with executable instructions that, when executed, cause the processor to perform:
        setting a keyword used when authenticating;
        setting a position of an input frame used when authenticating, the position of the input frame defined by coordinates of the input frame; and
        setting a magnitude of the input used when authenticating, the magnitude defined with a size of the input frame designated by the user from the input frames having different sizes.

5. An authentication method of utilizing a user's input operation for authentication, comprising:
    displaying a plurality of input frames having different sizes;
    prompting the user to input a keyword to within the input frame;
    judging a magnitude of the input by the user, the magnitude defined with a size of the input frame designated by the user from the input frames having different sizes;
    judging the inputted keyword; and
    judging a position of the input frame inputted by the user, the position of the input frame judged by coordinates of the input frame,
    wherein results of the judgments are used as authentication information for the authentication.

6. An authentication setting method, of setting a user's input operation used for authentication, executed in a computer, comprising:
    setting, using a processor in the computer, a keyword used when authenticating;
    setting, using the processor, a position of an input frame when authenticating, the position of the input frame defined by coordinates of the input frame; and
    setting, using the processor, a magnitude of the input used when authenticating, the magnitude defined with a size of an input frame designated by the user from the input frames having different sizes.

7. A computer readable, non-transitory medium recorded with a program making a computer utilizing a user's input operation for authentication, execute:
    generating a plurality of input frame data having different sizes, the input frame data prompting the user to input a keyword;
    judging a magnitude of the input by the user, the magnitude defined with a size of the input frame designated by the user from the input frames having different sizes;
    judging the inputted keyword; and
    judging a position of the input frame inputted by the user, the position of the input frame judged by coordinates of the input frame,
    wherein results of the judgments are used as authentication information for the authentication.

8. A computer readable, non-transitory medium recorded with a program making a computer setting a user's input operation used for authentication, execute:
    setting a keyword used when authenticating;
    setting a position of an input frame used when authenticating, the position of the input frame defined by coordinates of the input frame; and
    setting a magnitude of the input used when authenticating, the magnitude defined with a size of the input frame designated by the user from the input frames having different sizes.

* * * * *